July 31, 1956  J. W. LANG, JR  2,756,628
PRESSURE PLATE AND LENS MOUNTING FOR MOTION
PICTURE PROJECTING APPARATUSES
Filed March 27, 1953                                      2 Sheets-Sheet 2

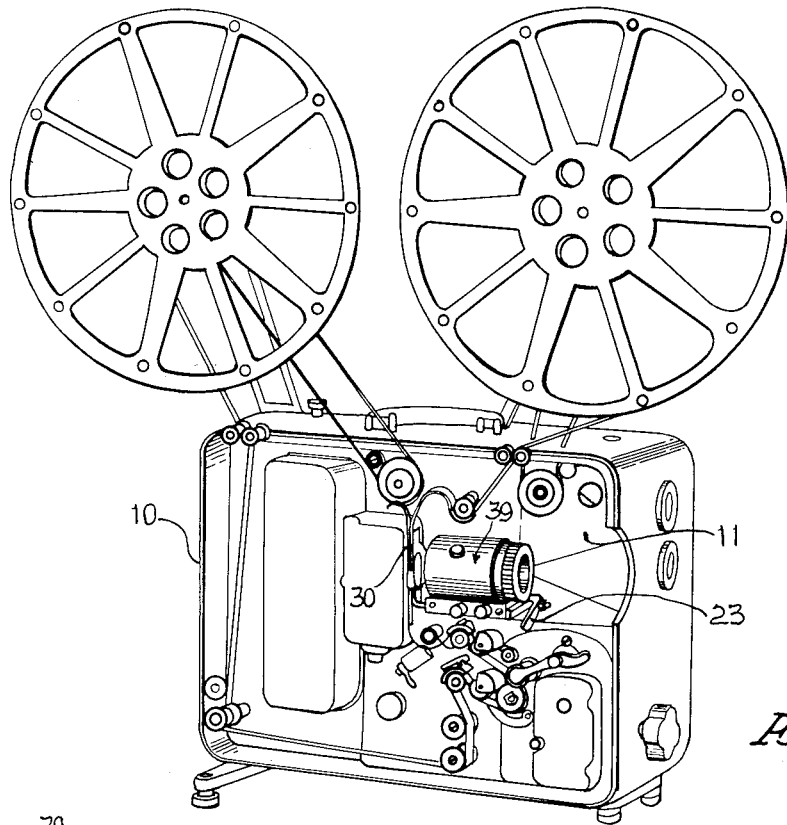
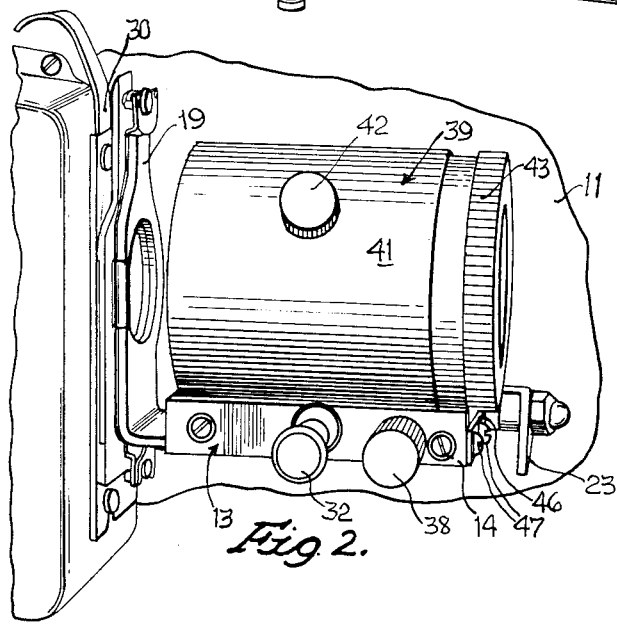
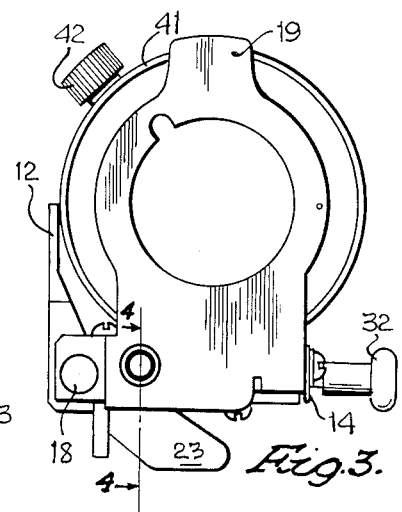

INVENTOR.
JOHN W. LANG, JR.
BY Clarence E. Threedy
HIS ATTORNEY

United States Patent Office 2,756,628
Patented July 31, 1956

2,756,628

PRESSURE PLATE AND LENS MOUNTING FOR MOTION PICTURE PROJECTING APPARATUSES

John W. Lang, Jr., Chicago, Ill., assignor to De Vry Corporation, Chicago, Ill., a corporation of Illinois Application March 27, 1953, Serial No. 345,103

1 Claim. (Cl. 88—17)

This invention relates to certain new and useful improvements in a pressure plate and lens mounting for motion picture projection apparatuses and has for its principal object the provision of an improved construction of this character which will be highly efficient in use and economical in manufacture.

Another object of my invention is the provision of a device of this character and construction by which the projection lens is adjustably carried by a suitable mounting permitting the lens to be readily and easily focused.

Still another and equally important object of my invention is the provision of an adjustable carriage for the projection lens which also provides for a pressure plate adjusting assembly permitting ready operation of the same.

Still another and equally important object of the invention is the provision of a projection lens carriage from which the lens may be easily and readily removed or replaced.

Other objects will appear hereinafter.

The invention consists in the novel combination and arrangement of parts to be hereinafter described and claimed.

The invention will be best understood by reference to the accompanying drawings showing the preferred form of construction and in which:

Fig. 1 is a perspective view of a motion picture projection apparatus embodying my invention;

Fig. 2 is a perspective view of my invention showing the same in normal operating position;

Fig. 3 is a front view of my invention showing the pressure plate in normal operative position;

Figure 4:
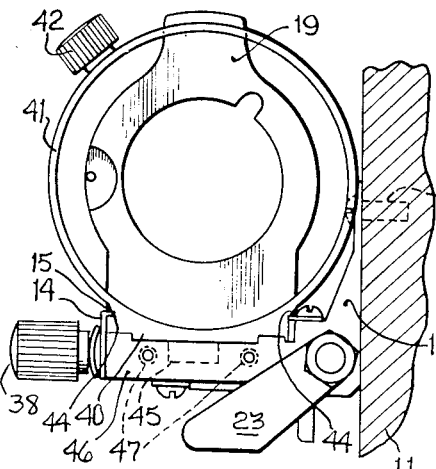
Fig. 4 is a rear view of my invention showing the pressure plate in relation to the lens carriage.
Figure 5:
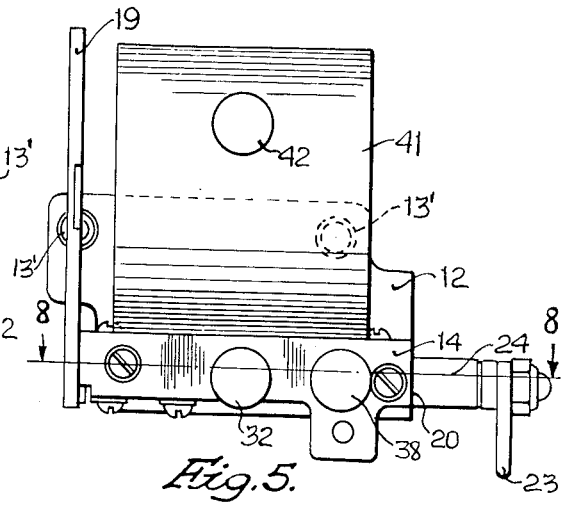
Fig. 5 is a side elevational view of my invention showing the pressure plate and lens carriage without the projection lens mounted therein.
Figure 6:
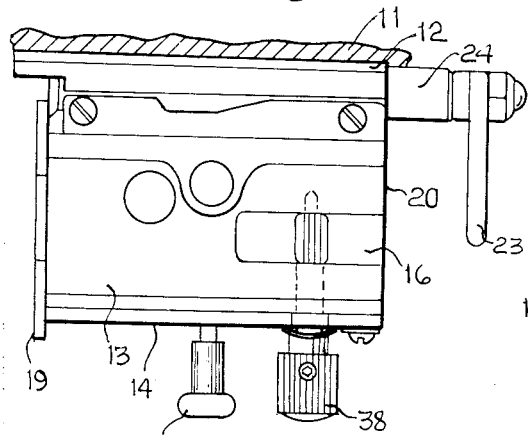
Fig. 6 is a to plan view of my improved mounting bracket without the lens carriage.
Figure 7:
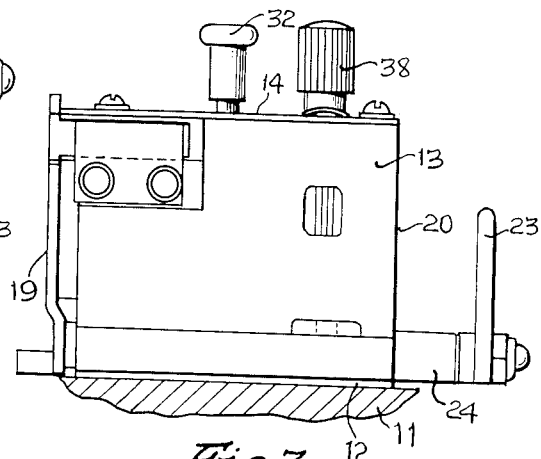
Fig. 7 is a bottom plan view of my improved mounting bracket.

Referring more particularly to the drawings, a motion picture projection apparatus embodying my invention is illustrated at 10. Carried by the center partition 11 of the apparatus 10 is a mounting plate 12 secured to the partition 11 by any suitable means, such as screws 13'.

This plate 12 provides a horizontally extending base bracket 13. The side walls 14 of this bracket 13 each have their upper portion bent inwardly to provide retaining lips 15 with the bottom of the bracket provided with a recess 16, the purpose and function of the lips and recess to be more fully described hereinafter.

Formed through the length of the bracket 13 adjacent the plate 12 is a bore 17. Journalled in the bore 17 is a slidable rod 18 of a length slightly longer than that of the bracket 13. At one end of the rod 18 is attached a pressure plate 19 of a construction such as that disclosed in Patent No. 2,617,327, and which per se makes up no part of my present invention. At the opposite end of the bore 17 adjacent the front wall 20 of the bracket 13 is a spring chamber 21 of a diameter larger than that of the bore 17. Positioned in this chamber 21 and embracing the rod 18 is a tension spring 22. The opposite exposed end of the rod 18 is provided with a handle 23 to facilitate sliding the rod 18 in the bore 17. Adjacent the handle 23 on the rod 18 is a boss 24 adapted to have one end 25 thereof bear upon the spring 22 when the rod 18 is moved laterally within the bore 17.

Journalled transversely of the length of the base bracket and bisecting the bore 17 is a passage 26. Slidably carried in this passage 26 is a locking pin 27. The inner end of this pin 27 is provided with a finger 28 which is adapted to project into a groove 29 formed in one side of the rod 18 to lock the rod 18 in a predetermined position, thereby positioning the pressure plate 19 in confronting relation with respect to an aperture plate 30, as viewed in Figs. 1 and 2. Journalled in the passage 26 and embracing a portion of the locking pin 27 is a spring 31 adapted to urge the pin 27 into locking engagement with the rod 18. The free end of the pin 27 is provided with a finger knob 32 to facilitate the moving of the pin 27 within the passage 26.

Cut in the front wall 20 of the bracket 13 and extending rearwardly therefrom up to but not into the passage 26, is the recess 16. Formed in the bracket 13 and perpendicular to the recess 16 is a passage 34. Carried by a bearing 35 in the passage 34 is a turn pin 36. Positioned in the recess 16 and carried by one end of the pin 36 is a pinion gear 37 adapted to be rotated with the turn pin 36. The free end of the pin 36 terminates in a threaded finger knob 38. The purpose and function of the recess 16 and the pinion gear 37 will be hereinafter described.

Indicated as at 39 is a projection lens mounting. This mounting 39 has a flat horizontal base portion 40 corresponding in size to the base bracket 13. Extending upwardly from this base portion 40 is a hollow circular holder 41. The construction is such that a projection lens 43 may be mounted in this holder 41, and a lens locking screw 42 carried by one side of the holder 41 may be tightened to secure the lens 43 in the holder 41. The base portion 40 of the lens mounting 39 has provided in its side walls thereof laterally extending grooves 44 into which fit the retaining lips 15 of the bracket 13 to slidably secure the holder 41 to the bracket 13.

On the bottom of the base portion 40 there is carried a rack bar 45 which is adapted to be positioned into the recess 16 formed in the base bracket 13. When the holder 39 is positioned on the base bracket 13, the rack bar 45 will be brought into engagement with the pinion gear 37 carried by the pin 36. From the foregoing, it will be apparent that upon turning of the pin 36, which in turn rotates the pinion gear 37, the teeth thereof will engage the rack bar 45 which in turn will move the holder 39 relative to the base bracket 13, thereby focusing the projecting lens 43 carried therein.

To prevent displacement of the lens holder 39 from the base bracket 13, a face plate 46 is fastened on the front end of the base bracket, closing the recess 16, as viewed in Fig. 4. This plate 46 may be attached to the bracket 13 by any suitable means, such as screws 47.

Figure 8:
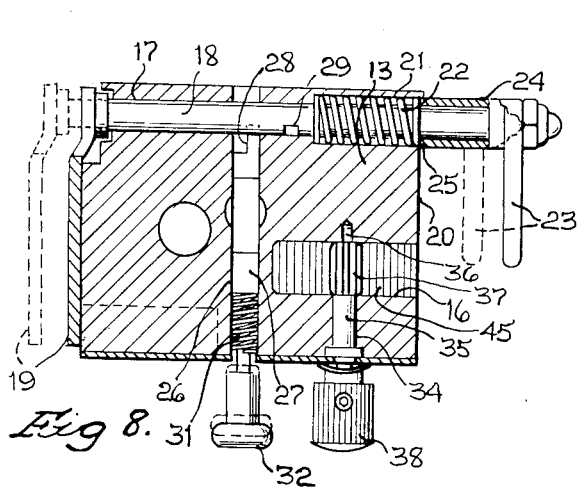
Fig. 8 is a detail sectional view of my mounting bracket taken substantially on line 8—8 of Fig. 5.
Figure 9:
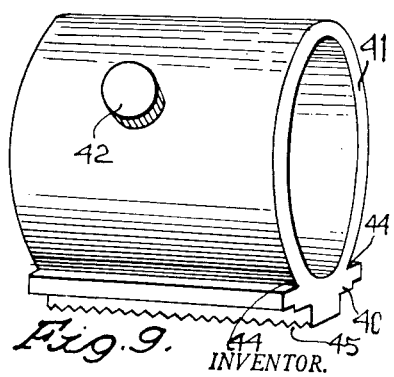
Fig. 9 is a perspective view of the lens carriage embodied in my invention.

In adjusting the pressure plate 19, for example, in threading film on the motion picture projection apparatus, the pin 27 is pulled away from the bracket 13 against the action of the spring 31, thus withdrawing the finger 28 from its position within the groove 29 formed in the rod 18. The rod 18 is then moved within the bore 17 by action of the spring 22 to the position shown in full lines in Fig. 8. After the film has been threaded upon the aperture plate 30, the operator by gripping the handle 23, may move the rod 18 in a reverse direction until the finger 28 under the action of the spring 31 engages in the groove 29 of the rod 18, as shown in dotted lines, Fig. 8.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

In combination, a pressure plate and projection lens mounting comprising a vertical wall and a horizontal base bracket extending laterally in one direction from said wall, said base bracket at is junction with said wall provided with a longitudinally extending bore into which projects a slidable rod, said pressure plate carried by one free end of said rod externally of said base bracket, a handle carried by the opposite end of said rod externally of said base bracket for slidably moving said rod through said base bracket so as to adjustably position said base bracket relative to said plate, said base bracket having a passage formed therein transversely of said bore and bisecting said bore to provide open communication therewith, a spring-urged displaceable pin projecting in said passage and adapted to engage said rod when said rod is moved in one direction with respect to said base bracket, a lens mounting providing a substantially flat base having independently operative connection to said base bracket, said substantially flat base providing a rack bar adapted to project into a slot formed longitudinally in said base, a pinion gear carried by said base in said slot and having a portion projecting outwardly of said base, said gear being adapted to engage said rack bar, means carried by said portion of said gear for rotating said gear to move said lens mounting independently of said pressure plate relative to said base.

References Cited in the file of this patent

UNITED STATES PATENTS

| | | |
|---|---|---|
| 352,639 | Allen | Nov. 16, 1886 |
| 1,075,692 | Cannock | Oct. 14, 1913 |
| 1,907,753 | Dina | May 9, 1933 |
| 2,111,741 | Runge | Mar. 22, 1938 |
| 2,339,503 | Miller | Jan. 18, 1944 |
| 2,431,681 | Barstow | Dec. 2, 1947 |
| 2,506,948 | Wienke | May 9, 1950 |